United States Patent [19]

Herbst

[11] Patent Number: 4,941,170

[45] Date of Patent: Jul. 10, 1990

[54] FACSIMILE TRANSMISSIONS SYSTEM

[75] Inventor: Noel M. Herbst, Menlo Park, Calif.

[73] Assignee: Tandem Computers Incorporated, Cupertino, Calif.

[21] Appl. No.: 326,407

[22] Filed: Mar. 20, 1989

Related U.S. Application Data

[63] Continuation of Ser. No. 122,569, Nov. 16, 1987, abandoned, which is a continuation of Ser. No. 825,001, Jan. 30, 1986, abandoned.

[51] Int. Cl.$^5$ .................. H04M 11/00; H04N 1/21; H04N 1/32
[52] U.S. Cl. .................. 379/100; 358/402; 358/440
[58] Field of Search .................. 379/53, 93, 94, 100; 358/257, 263, 402, 403, 407, 440

[56] References Cited

U.S. PATENT DOCUMENTS

| | | | |
|---|---|---|---|
| 3,920,895 | 11/1975 | Vieri et al. | 358/263 |
| 4,086,443 | 4/1978 | Gorham et al. | 358/257 |
| 4,207,598 | 6/1980 | Reich et al. | 358/257 |
| 4,352,012 | 9/1982 | Verderber et al. | 358/257 X |
| 4,506,111 | 3/1985 | Takenouchi et al. | 179/2 A |
| 4,638,368 | 1/1987 | Shimizu et al. | 358/263 X |
| 4,652,933 | 3/1987 | Koshiishi | 358/257 X |
| 4,672,459 | 6/1987 | Kudo | 358/257 |
| 4,719,517 | 1/1988 | Vano | 358/257 X |
| 4,759,053 | 7/1988 | Satomi et al. | 379/100 |

FOREIGN PATENT DOCUMENTS

| | | | |
|---|---|---|---|
| 55-64471 | 5/1980 | Japan | 358/257 |
| 56-84072 | 7/1981 | Japan | 358/257 |
| 58-25760 | 2/1983 | Japan | 358/257 |
| 58-30266 | 2/1983 | Japan | 179/2 TV |
| 60-83459 | 5/1985 | Japan | 358/257 |
| 60-160262 | 8/1985 | Japan | 358/257 |
| 59-92052 | 11/1985 | Japan | 358/257 |

OTHER PUBLICATIONS

T. Kamae, "Development of a Public Facsimile Communication System Using Storage and Conversion Techniques", IEEE 1980, National Telecommunications Conference, Houston, Tx, Nov. 30–Dec. 4, 1980, pp. 19.4.1–19.4.5.

IBM Scanmaster I Descrptn Publn No. GA18-2094-0—Chap. 2, Functional Descrptn, pp. 2-1 to 2-24, copyright 1982.

Xerox Telecopier 495-I Facsimile Terminal Brochure, Copyright 1984.

Xerox Telecopier 495 Brochure, no copyright date.

Primary Examiner—Keith E. George
Attorney, Agent, or Firm—Townsend and Townsend

[57] ABSTRACT

A facsimile transmission system is used to transmit documents over telephone lines using an electronic mail system, which may be a localized system or a distributed electronic mail system. Transmission is initiated by the sending facsimile machine transmitting a mark sense cover sheet, which has a mark sense identifier printed on it, to a facsimile controller. The controller checks for the presence of the mark sense identifier and if present, the controller reads the identifying information and destination address coded thereon. The controller then transmits the identifying information and destination address and the subsequently received document facsimile data to the electronic mail system in digital form, for retransmission back through the same or a different controller to one or more receiving facsimile machines.

31 Claims, 5 Drawing Sheets

FIG._1.

PRIOR ART

1PL56RZ,036,4155551212,J.JONES
  62    64    66          68

FACSIMILE TRANSMISSIONS SYSTEM

This is a continuation of application Ser. No. 122,569, field Nov. 16, 1987, now abandoned, which is a continuation of application Ser. No. 825,001, filed Jan. 30, 1986, now abandoned.

This application contains a computer program listing as a microfiche appendix including 11 frames.

BACKGROUND OF THE INVENTION

Information is often transferred between two computers over public telephone lines through the use of modems at each computer. This allows the user to transfer the text of documents, once keyed into the computer, very quickly. There are some limitations with this type of data transfer. The recipient must be ready to receive the data. Only textual type of matter, such as letters, numerals and symbols, can be transmitted in this way. Graphic material, such as photographs, charts and drawings, cannot be so transmitted. Also, unless the software between the two computers is compatible, only blocks of information can be transmitted; special control characters, such as those for centering of a topic heading, are not usable at the receiving end when transmitted. Therefore the data often must be reformatted to look anything like, for example, a letter.

Electronic mail systems have become very popular of late because they free the parties from having to make sure that the other party is ready to receive the message. Basically, electronic mail systems use a specially programmed computer or network of computers through which all messages and documents pass. In practice, the user first telephones the electronic mail system to gain access to it. After the user's authority has been verified, the user transmits (uploads) the message or document for later access (download) by another subscriber to the electronic mail system. The user can also check to see if the user has any waiting messages or documents. If so, the recipient user can ask the electronic mail system to transmit (download) the message or document to the user's computer for viewing, printing or storage.

Some electronic mail systems are relatively small and are used to connect computers or terminals within an office. Another type of mail system, called a distributed electronic mail system, uses several computers at different locations. This type of system has gained popularity for users wishing to transfer data across long distances or between different physical facilities. Distributed electronic mail systems typically transfer data over long distances using high speed lines and locally using slower transmissions over the public telephone system. Concentrating long distance communication over high speed lines is important in reducing costs. As used in this application, high speed data transmission lines refers to transmission of data at speeds orders of magnitude greater than that conventionally used to transmit facsimile data over public telephone lines. For example, normal facsimile data transmission over the public telephone system is typically from 300 to 9600 bits per second while high speed data transmission commonly occurs at speeds ranging from 9600 to 256,000 bits per second.

Some types of electronic mail systems are usable by the general public so that anyone with a computer or terminal can access the electronic mail system through the public telephone system. These public access electronic mail systems can be the distributed type or they can locate all their hardware and software at one central location depending on communications costs.

Electronic mail systems have many advantages over simple computer-to-computer document transmission systems; they are still, for the most part, limited to text. Also, if one wishes to transmit the text of a message already typed or printed, this information must either be keyed into the computer before it can be transmitted or transformed by an optical character reader, which is often not possible or not practical.

SUMMARY OF THE INVENTION

The present invention is directed to a facsimile transmission system which provides a relatively simple and economical way to make facsimile transmissions among users through an electronic mail system using conventional facsimile machines.

Broadly, the facsimile transmission system of the present invention transmits facsimile data corresponding to one or more document sheets (hereafter usually called document facsimile data) using a facsimile machine, an electronic mail system, a communication network, typically a telephone line, and a facsimile controller. Operation begins by transmitting, via a sensing facsimile machine, facsimile data corresponding to a mark sense cover sheet to a facsimile controller that operates with the mail system. The facsimile controller is capable of demodulating facsimile transmissions and making them readable by the electronic mail system computer. The cover sheet has a mark sense identifier at an upper region of the sheet for identification by the facsimile controller. When the mark sense identifier is detected, the facsimile controller treats the remainder of the facsimile data on that sheet as being from a mark sense cover sheet.

The mark sense cover sheet includes an information region as well as the identifier region. The information region is divided by the facsimile controller into a number of cells within which marks are provided by the sender to identify the destination address. Typically the destination address can be an address for a person, a distribution list for a number of addresses, or a transfer folder wherein the document facsimile data is stored by the electronic mail system at an appropriate location. The information region preferably also provides space for the identity of the sender.

At the end of the transmission of the mark sense cover sheet facsimile data, the facsimile controller communicates the identity of the sender and the destination address, which it has decoded from the information region of the mark sense cover sheet, to the electronic mail system. The document facsimile data is then transmitted to the facsimile controller. The facsimile controller checks the mark sense identifier region for the presence of a mark sense identifier. If none is found, the document facsimile data is transmitted from the controller to the electronic mail system. The electronic mail system acts on the document facsimile data according to the destination address obtained from the mark sense cover sheet. Thereafter, the document facsimile data is retransmitted through the same or a different facsimile controller to a receiving facsimile machine.

A primary advantage of the invention is that the system decodes the mark sense facsimile data at one or more central locations. This allows one or a relatively small number of facsimile controllers, which decode the mark sense cover sheet facsimile data, to be accessed by numerous conventional facsimile machines with no specialized adaptations to the facsimile machines. Thus, the system provides great economic advantages compared with providing each facsimile machine with its own facsimile controller. The system of the present invention is not limited to transfer of facsimile data between a specific type or kind of facsimile machine. Rather the system can be used with most conventional facsimile machines. Also no modifications need to be made to the electronic mail system; the facsimile controller is programmed to provide it with the sender identity and destination address as needed by the electronic mail system and in the appropriate format.

Another advantage of the invention accrues when used with a distributed electronic mail system. In such a system, a facsimile controller is used with each computer. Usually transmissions occur as straight-through transmissions from the sending facsimile machine, through the distributed electronic mail system and to the receiving facsimile machine. The facsimile data is therefore transmitted over the bulk of the distance over the high speed lines connecting the mail system computers. This saves the cost of transmitting the data between the mail system computers over public telephone lines (assuming the high speed lines are already in place and available). It also speeds facsimile transmission and provides much more accurate transmission because, in part, of the more sophisticated communication protocols used with high speed data transmissions compared with those used with conventional facsimile machines.

Another feature of the invention is the use of the mark sense identifier to both indicate that the sheet is a mark sense cover sheet and to register the facsimile data corresponding to the mark sense cover sheet. Further, vertically positioned timing marks can be used to allow the controller to re-register the mark sense cover sheet facsimile data in the vertical (paper feed) direction. This helps to ensure accurate reading of the destination address entered in the information region of the mark sense cover sheet.

Other features and advantages of the invention will appear from the following description in which the preferred embodiments have been set forth in detail in conjunction with the accompanying drawings.

DETAILED DESCRIPTION OF THE PREFERRED EMBODIMENT

Figure 1:
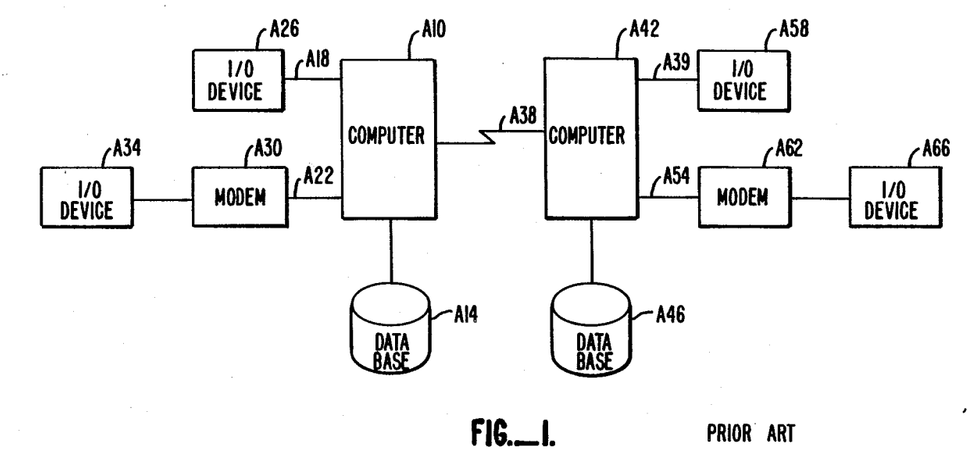
FIG. 1 is a block diagram of a conventional electronic mail system.

A typical electronic mail system, and particularly the electronic mail system sold under the trademark TRANSFER for use with Tandem T-16 Nonstop Computers made by Tandem Computers, Inc. of Cupertino, California is shown in FIG. 1. The electronic mail system includes a computer A10 which maintains a data base A14. Computer A10 communicates with users at one location through I/O ports A18 and A22. I/O ports A18 and A22 may be coupled to a number of different I/O devices. For example, I/O port A18 is shown coupled to an I/O device A26, and I/O port A22 is shown coupled to a modem A30 which, in turn, is coupled to an I/O device A34. Computer A10 communicates electronic mail packages across a communication link A38 to a computer A42. Computer A42 maintains a data base A46. Computer A42 communicates with its associated users through I/O ports A50 and A54. As with computer A10, I/O ports A50 and A54 of computer A42 may be coupled to a number of I/O devices. For example, I/O port A50 is coupled to an I/O device A58, and I/O port A54 is coupled to a modem A62 which, in turn, is coupled to an I/O device A66.

Data bases A14 and A46 of FIG. 1 contain distribution lists, user profiles, and holding areas for the actual packages and parts of packages (items). A distribution list allows a correspondent to send packages to multiple destinations, while referencing those destinations by only one common name. Before packages are delivered tot he correspondents on a distribution list, TRANSFER replaces the reference distribution list name with the actual names of the correspondents on the list. The user profiles describe the correspondents who have access to the data base. These profiles are managed by TRANSFER.

Figure 2:
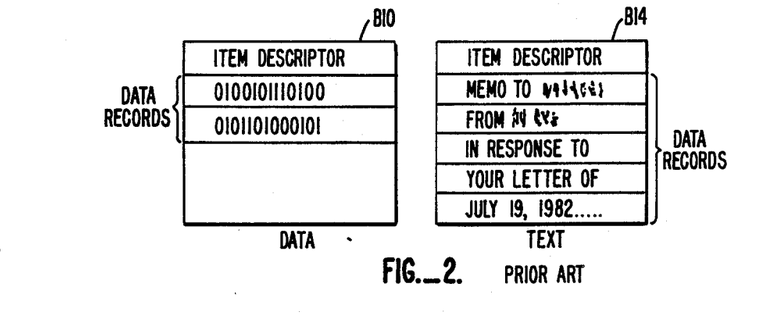
FIG. 2 is a diagram showing the format of items processed by the electronic mail system of FIG. 1.

Packages are made up of discrete collections of data known as items. Examples of item are shown in FIG. 2. Items can range in size from zero bytes to many thousands of bytes. Each item always includes an item descriptor which comprises one or more records that identify the item and describes the attributes and composition of the item. Each item is identified by its own unique item ID. In addition, the item may include zero or more data records. For example, item B10 is an example of an item that consists of a plurality of binary data records, and item B14 is an example of an item that consists of a plurality of text records. An item usually contains only one kind of data whether that data is text, ASCII data, or some other data type defined by the user's application. Packages, however, are not limited to items of a single type. For example, a package may contain both items B10 and B14. Thus, data bases A14 and A46, which supply the items used to create the packages, may contain program code, text messages and any other data communicated between nodes within the electronic mail system.

Figure 3:
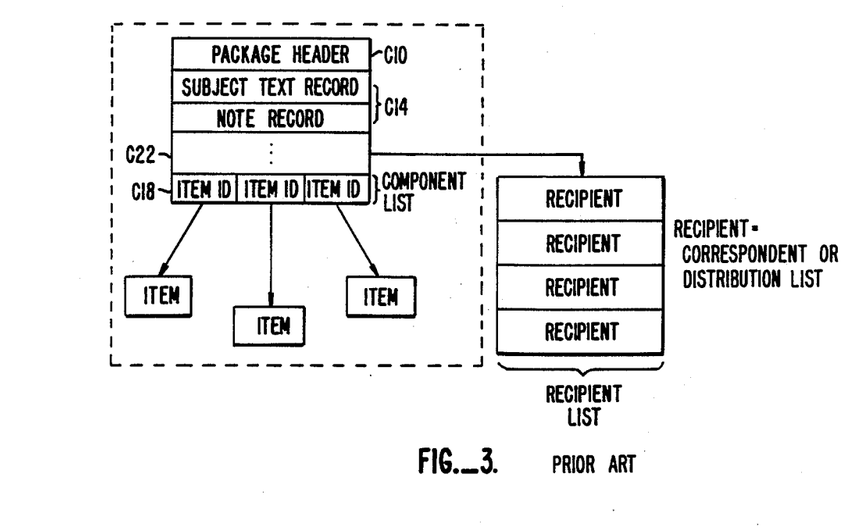
FIG. 3 is a diagram showing the format of packages processed by the electronic mail system of FIG. 1.

In order for the electronic mail system to deliver items from one correspondent to another, the items must be assembled as packages as shown in FIG. 3. Each package includes a package header item C10, zero or more optional text records C14, an item component list C18, and a recipient list C22. The package header item C10 is like the label on an actual mail package; it indicates who is sending the package and to whom, when the package was posted, and what its delivery priority is. The package header might also indicate the time frame in which the package should be delivered. The text records C14 are optional and are used by the sender to comment on the contents of the package (like a bill of lading). Component list C18 contains address pointers to items stored in data base A14 or A16 to be sent in the package.

The electronic mail system does not interpret or process the data in the packages. The electronic mail system merely blocks the items together and sends them in bulk across communication network A38. Processing of the item data is the responsibility of the user's application program. For example, the application program may format text data for viewing on a computer display screen, or it may route the item data to a line printer.

Recipients of packages need not be available to receive them. If the recipients are unavailable, then the electronic mail system stores packages for those recipients in holding files in the appropriate data base A14 or A46, and the recipients can collect them at their own convenience, typically by accessing the electronic mail system through an appropriate computer terminal.

Figure 4:
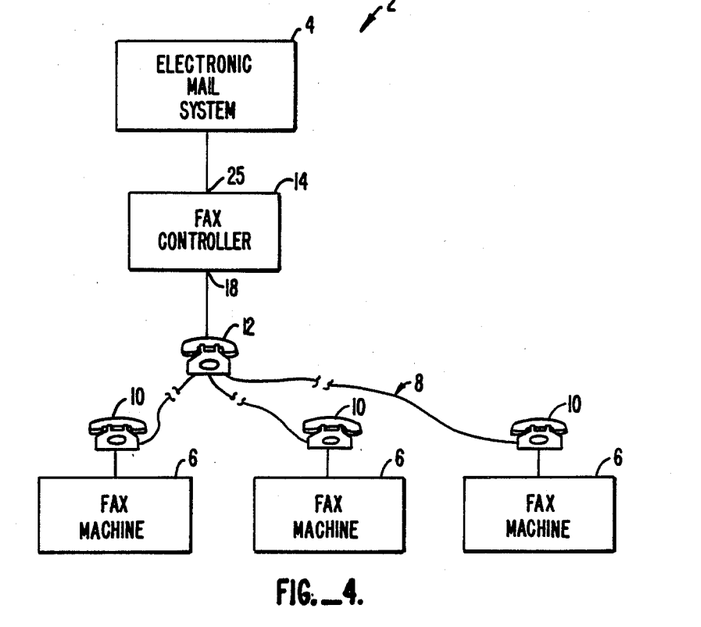
FIG. 4 is a schematic diagram of a facsimile transmission system of the invention.

Turning now to FIG. 4, the broad system concept of the invention will be described. A facsimile transmission system 2 is shown to include a conventional electronic mail system 4. The preferred embodiment will be described in terms of an electronic mail system sold under the trademark Transfer, for use with Tandem T-16 NonStop computers made by Tandem Computers, Incorporated of Cupertino, California. System 2 also includes a number of conventional facsimile machines 6 (with integral modems) coupled to one another and to system 4 by a network 8, typically the public telephone network. Thus, in the preferred embodiment, facsimile machines 6 are interconnected through network 8 and telephone connections 10. A telephone connection 12 couples telephone network 8 to system 4 through a facsimile controller 14. Facsimile controller 14 controls and decodes information flowing from one facsimile machine 6 to electronic mail system 4 and then from system 4 to another facsimile machine 6. In the preferred embodiment, the public telephone system is used as the communication network. If desired, the communications network can be a hardwired system to enable the facsimile data to be transmitted directly without the need for dialing.

Figure 5:
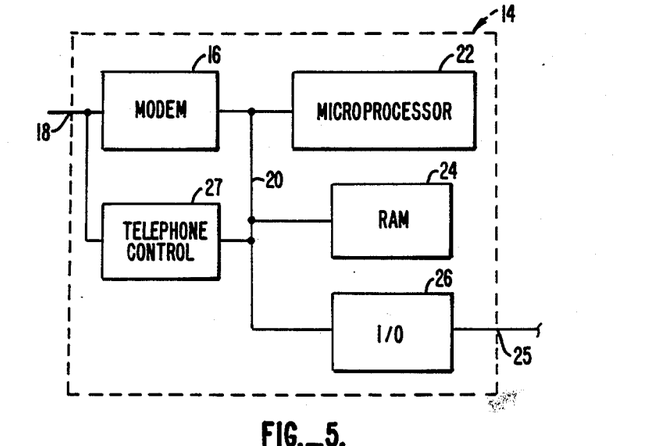
FIG. 5 is a schematic representation of the facsimile controller of FIG. 4.

Turning now to FIG. 5 facsimile, controller 14 is shown in a very simplified form and is seen to include a modem 16 coupling a telephone port 18 to a bus 20. Bus 20 interconnects a microprocessor 22, such as the 68000 microprocessor made by Motorola, Inc. of Phoenix, Az., modem 16, a random access memory 24 and an input/output device 26 connecting bus 20 to a computer terminal port 25.

A telephone control 27 is connected between bus 20 and telephone port 18. Control 27 controls the various functions associated with telephone network 8. For example, control 27 provides hook control which senses whether the receiver is on hook (hung up) or off hook, energy detect which senses the dial tone once the system is off hook, ring interrupt which asks the main computer in system 4 if it should place the system off hook when controller 14 is rung through telephone connection 12, and a dialer which dials the appropriate telephone connection 10 when controller is to retransmit facsimile data. Also, telephone control 27 provides the data access arrangement, required by governmental regulations, which provides electrical isolation for network 8. Microprocessor 22 supervises the transmission and reception of data from and to facsimile machines 6 and decodes the data during reception. Its function will be described in more detail below.

The use of facsimile controller 14 allows those users of electronic mail system 4 that have facsimile machines 6 to transfer facsimile documents among one another using the features of electronic mail system 4. Electronic mail system 4 allows a user to send a message or information to an individual, to a list of individuals or to a holding file in the electronic mail system itself. These capabilities are realized for the transmission of facsimile information, rather than just keyed in text, with the invention. To enable system 4 to do so, the first sheet of facsimile data transmitted from a facsimile machine 6 to facsimile controller 14 is from a mark sense cover sheet 28, shown in FIG. 6. Cover sheet 28 has a specially devised mark sense identifier 30 printed on cover sheet 28 near its upper left hand corner. In the preferred embodiment, identifier 30 comprises nine vertical, spaced apart lines. Whenever controller 14 starts to receive a new sheet of facsimile data from a facsimile machine 6, controller 14 is programmed to search the initial scan lines to check for the nine bars of the proper spacing. If it does so, it records one good line. If 20 good lines are received within the first three inches of the sheet, then the mark sense logic is enabled and the remainder of the sheet is treated as a mark sense cover sheet.

Figure 6:
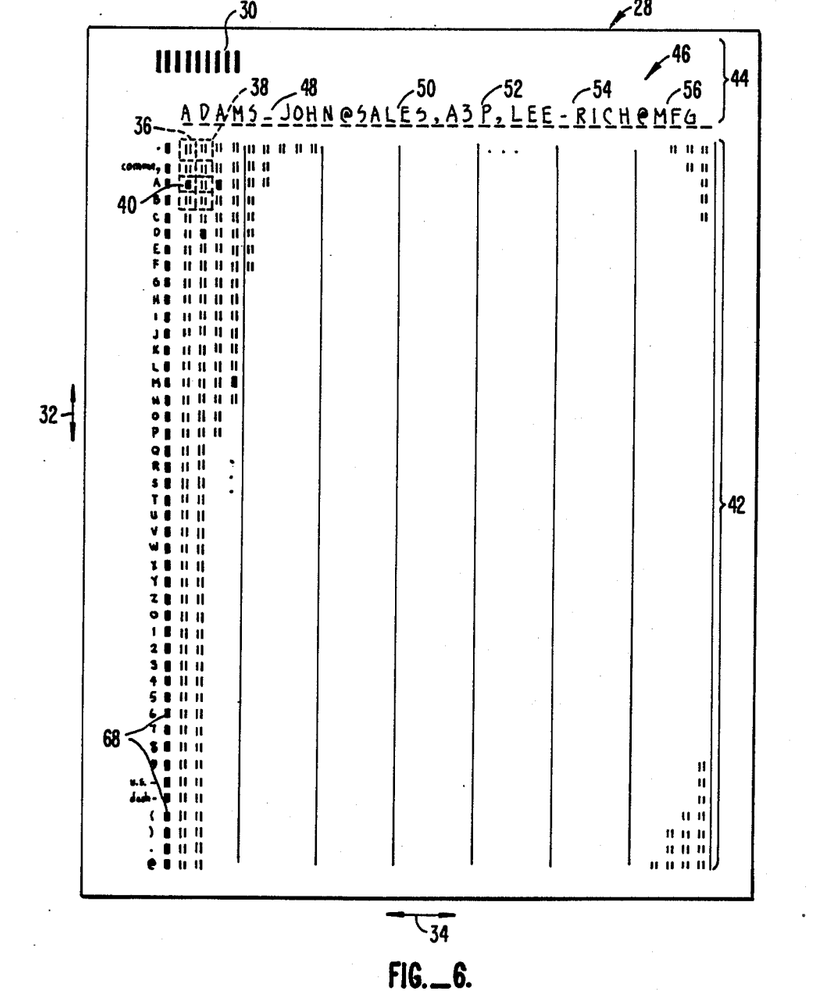
FIG. 6 shows a mark sense cover sheet partially filled in for use with a private electronic mail system.

After the mark sense logic is enabled, the first blank line to occur defines the bottom of the set of bars comprising identifier 30. This registers cover sheet 28 in a vertical or y direction, that is in the direction of the paper feed in facsimile machines 6, indicated by arrow 32. The average horizontal or x position of the bars comprising mark sense identifier 30 provides for horizontal or x registration of mark sense cover sheet 28, the x direction being indicated by arrow 34. After doing so, a portion of mark sense cover sheet 28 is divided into an array of cells 36 in controller 14. The limit of the cells is indicated by an imaginary mark sense grid 38.

Data entries 40 are made in the appropriate cells 36 cells 36 together make up an information field 42 while mark sense identifier 30 is found within a mark sense identifier field 44, constituting the upper portion of cover sheet 28. As is obvious from the filled in sample cover sheet 28 of FIG. 6, identifying information and destination address 46 becomes a series of data entries 40 created by the user marking in the appropriate cells 36. After the mark sense logic of controller 14 is enabled, the presence of data entries 40 within information field 42 is sensed by controller 14 and translated into a form of identifying information and destination address 46 usable by electronic mail system 4.

More specifically, the facsimile data from the mark sense cover sheet is converted into a 1,540 byte array corresponding to the mark sense selection positions. That is, each byte indicates the relative darkness of the corresponding selection box. This 1,540 bytes of information is preceded by a control filed which identifies this block of data as mark sense data. After the mark sense information is converted into the 1,5040 byte array and control field, it is transmitted to the electronic mail system for conversion into a package header.

During the transmission of any sheet of facsimile data, microprocessor 22 interrogates the data and temporarily stores the data in ram 24 while determining if the initial data includes facsimile data corresponding to mark sense identifier 30. If it does, the remainder of the facsimile data is interrogated and the facsimile data from information field 42 representing data entries 40 is processed by microprocessor 22 and stored as identifying information and destination address in RAM 24. At the end of cover sheet 28, the identifying information and destination address from information field 42 is transmitted to electronic mail system 4 so that system 4 will know what to do with the following document facsimile data. Typically, all identifying information and destination address can be placed on a single cover sheet 28. However, microprocessor 22 is programmed to accept two or more consecutive cover sheets 28 when needed to transmit all necessary identifying information and destination address.

Following the transmission of cover sheet 28, microprocessor 22 continues to interrogate the initial facsimile data for identifier 30. When microprocessor 22 does not find a mark sense identifier 30 within mark sense identifier field 44, controller 14 knows the facsimile data being transmitted is document facsimile data. Controller 14 then causes all the facsimile data from that sheet temporarily stored in RAM 24 to be transmitted to system 4 through input/output device 26.

More particularly, the facsimile data is organized as 1600 byte blocks preceded by a control field which identifies the block as facsimile data. The blocks are communicated to the electronic mail system wherein the block identifiers are used to make up the component list C18. The blocks themselves are stored at data records within items in the appropriate data base A14 or A46. When the end of a document page is reached, the program communicates an end-of-page record to the electronic mail system. This informs the electronic mail system that no further data blocks are to be added to the item (which corresponds to a page) within the package under construction. The mark sense logic in microprocessor 22 is switched of so that facsimile data from a facsimile machine 6 passes through facsimile controller 14 without interrogation or modification until a start sheet signal is sent by facsimile machine 6 to signify the start of transmission of a new sheet. The mark sense logic is again enabled and the process starts again.

If an error is detected by controller 14, controller 14 signals the sending facsimile machine 6 to halt transmission. The facsimile data received thus far can be saved by a default routine, which can, for example, send such data to a holding file in system 4, to a chosen default recipient facsimile machine 6 or to a distribution list of facsimile machines 6.

Identifying information and destination address 46 on cover sheet 28 includes the sender's name 48, the sender's address 50, the sender's authorization code 52, the recipient's name 54, and the recipient address 56. This identification information and destination address is typical of that which may be used for an in-house, private electronic mail system. It should be noted that users of system 2 need not remember the telephone number of the recipient. Rather controller 14 is programmed to recognize the recipient's name and address (such as that shown in FIG. 6) and uses this to provide system 4 with the recipient's telephone number. This is particularly useful when the recipient is in a different country.

Figure 7:
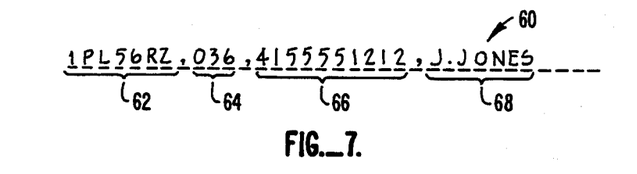
FIG. 7 shows exemplary identification and destination address for use with a public electronic mail system accessed through a public telephone system.

Facsimile transmission system 2 can also be used for senders who are authorized to use an electronic mail system in which network 8 is a pubic telephone network. FIG. 7 shows an exemplary set of identifying information and destination address 60 under such circumstances. Information 60 includes a group password 62, a sender identification code 64, the recipient's facsimile machine telephone number 66 and the recipient's name 68. How information 60 is set up and what is needed is determined in large part by the requirements of electronic mail system 4. A source listing for the computer program used with microprocessor 22 and electronic mail system 4 of the preferred embodiment is found at the microfiche appendix. This program is written in ADA.

Timing marks 68 are placed along the vertical or paper feed direction 32 of cover sheet 28. Timing marks 68 are recognized by microprocessor 22 and their positions are used to re-register information field 42 along the length, that is in the direction of arrow 32, of mark sense cover sheet 28. Providing timing marks for periodically registering information field 42 in the x direction, that is parallel to arrow 34, does not appear to be necessary with modern commercial facsimile machines 6.

To use system 2 to transmit (upload) document facsimile data, the user first fills out a mark sense cover sheet 28 with the necessary identification and destination address 46 or 60. Next, cover sheet 28 is transmitted by facsimile machine 6 through telephone connection 10, along network 8, through telephone connection 12 and to facsimile controller 14. Facsimile controller 14 reviews the incoming facsimile data to check for the presence of mark sense indicator 30. If found, the sheet being transmitted is treated as a mark sense cover sheet 28 and the facsimile data representing the identification and destination address in information field 42 is read and decoded by microprocessor 22. Subsequently transmitted (uploaded) document facsimile data also passes from facsimile machine 6, through telephone connection 10, along network 8, through telephone connection 12, through facsimile controller 14 and to electronic mail system 4. Document facsimile data is acted upon by electronic mail system 4 according to the routing instructions. Subsequently the document facsimile data is transferred (downloaded) from system 4, through facsimile controller 14, through telephone connection 12, along network 8, through a telephone connection 10 and to a receiving facsimile receiving machine 6.

Figure 8:
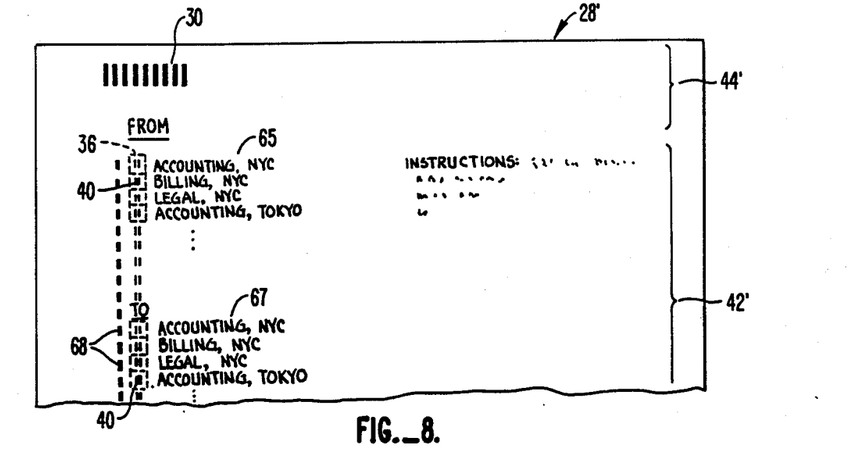
FIG. 8 shows a portion of a mark sense cover sheet used with a predetermined number of sending and receiving facsimile machines.

In some oases only a predetermined number of distribution addresses are needed. In such situations, a modified cover sheet 28', shown in FIG. 5, can be used. Sheet 28' is similar to sheet 28 and includes mark sense identifier 30 in identifier field 44' and a single column of cells 36 aligned with timing marks 68. Cells 36 are labeled with the various senders' and recipients' names 65, 67. This permits the user to quickly and easily identify sender and recipient by any making a minimum number of data entries 40. The convenient nature of the address entries also permits multiple recipient addresses to be easily provided on a single mark sense cover sheet 28'.

Figure 9:
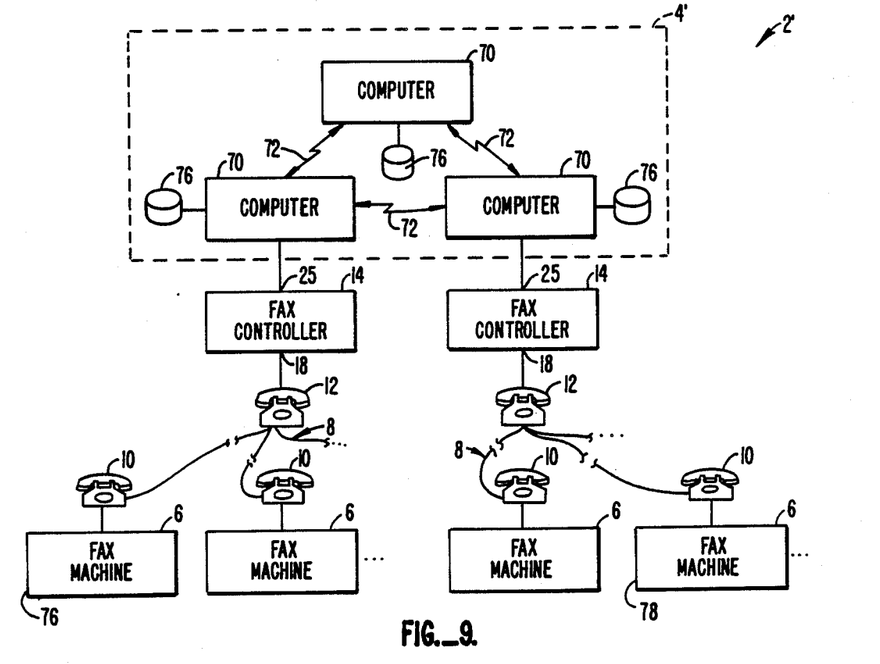
FIG. 9 shows a schematic diagram of another embodiment of the facsimile transmission system using a distributed electronic mail system and more than one facsimile controller.

Turning now to FIG. 9, an alternative embodiment of the invention is shown. The elements of system 2'0 which are identical to the system 2 of FIG. 4 have the same reference numerals. System 2' includes a distributed electronic mail system 4'. Mail System 4' includes a number of computers 70, such as the Tantem T-16 NonStop computers, coupled to one another through high speed data transfer lines 72. Each computer is connected to its own disk storage 76. In the embodiment shown, two of computers 70 are connected to a facsimile controller 14. Assuming one computer 70 is in New York City and the other computer 70 is in Tokyo, facsimile transmissions from users in and around New York City to users in and around Tokyo is greatly facilitated by this system. In particular, a sending facsimile machine 76 can make a local telephone call to its local facsimile controller Which is coupled to its local computer 70. Transmission of the facsimile data between computers 70 along high speed line 72 is perhaps faster than would have occurred along telephone lines and is more reliable because of the communication protocols used when transmitting computer data. The receiving facsimile machine 78 receives the facsimile data from its local computer 70. Therefore, only two local telephone calls have been involved.

With this system high speed lines 72 are available for both conventional data transmission between computers 70 and for transmission of facsimile data as well. Such a distributed system can be advantageously used for a company to communicate among various branches in different cities and even in different countries. It can also be useful for publicly accessible electronic mail systems. For example, a computer 70 could be physically located in twenty different metropolitan areas in the U.S. and in several foreign countries. The user would simply telephone the closest computer 70 to transfer the facsimile data to a receiver. In such a system, the address of the recipient would likely be a telephone number, as is used in FIG. 7. The recipient need not be qualified to use mail system 4' and yet still be able to receive facsimile data through system 4'.

Modification and variation can be made to the disclosed embodiments without departing from the subject of the invention as defined in the following claims. For example, facsimile controller 14 can be programmed with set destination address so all facsimile data is retransmitted (downloaded) to the same recipient or list of recipients. This would eliminate the need for cover sheet 28. With such a modification some flexibility could be achieved without a cover sheet 28 by using different telephone connections 12 for different recipients. Also, controller 14 is preferably physically near system 4. If desired controller 14 could be at a remote location and coupled to system 4 by an appropriate communication connection. In such case controller 14 would serve as a remote concentrator for facsimile machine transmissions near its physical location.

What is claimed:

1. An apparatus for transmitting document facsimile data through a conventional text electronic mail system using conventional facsimile machines coupled to one another through a communication network, the electronic mail system being of the type wherein text messages including a first destination address for a first I/O device are input to the electronic mail system at a second I/O device and communicated to the first destination address as packages of binary encoded text characters by the electronic mail system, the apparatus comprising:
   receiving means for receiving the document facsimile data from a transmitting facsimile machine, the document facsimile data including:
   a first document sheet having coding thereon identifying the first document sheet as containing document facsimile data for the first destination address; and
   a second document sheet containing facsimile data to be transmitted to the first destination address;
   first blocking means, responsive to the receiving means, for converting the coding in the first document sheet into a first block having bytes identifying the first destination address;
   second blocking means, responsive to the receiving means, for converting the second document sheet into a second block comprising binary encoded facsimile data, the second block including a plurality of binary encoded fields forming a record which identifies the second block; and
   wherein the electronic mail system includes:
   grouping means, responsive to the first blocking means and to the second blocking means, for logically grouping the first and second blocks together as a package.

2. The apparatus according to claim 1 wherein the electronic mail system further comprises transmitting means for transmitting the package to the first destination address.

3. The apparatus according to claim 2 wherein the electronic mail system further comprises storing means for storing the package.

4. The apparatus according to claim 3 wherein the first destination address corresponds to a holding file in the storing means.

5. The apparatus according to claim 4 wherein the electronic mail system further comprises accessing means for accessing the package in the holding file.

6. The apparatus according to claim 2 wherein the first destination address corresponds to the name of a recipient user of the electronic mail system.

7. The apparatus according to claim 2 wherein the first destination address corresponds to a telephone number of a recipient facsimile machine.

8. The apparatus according to claim 2 wherein the first destination address corresponds to a distribution list having a plurality of second destination addresses.

9. The apparatus according to claim 8 wherein the package includes:
   a package header which identifies the first destination address;
   a recipient list which identifies the plurality of second destination addresses; and
   a pointer to the second block associated with the destination address.

10. The apparatus according to claim 2 wherein the document facsimile data includes a plurality of second document sheets containing facsimile data to be transmitted to the first destination address, and wherein the second blocking means converts the plurality of second document sheets into a plurality of second blocks comprising binary encoded facsimile data, each second block including a plurality of binary encoded fields forming a record which identifies that second block.

11. The apparatus according to claim 10 wherein the package includes:
   a package header which identifies the first destination address; and
   a plurality of pointers to the plurality of second blocks associated with the destination address.

12. The apparatus according to claim 2 wherein the electronic mail system further comprises:
   a first computer located together with the first I/O device at a first location; and
   a second computer located together with the second I/O device at a second location.

13. The apparatus according to claim 12 wherein the transmitting means transmits the package between the first and second locations.

14. The apparatus according to claim 13 wherein the transmitting means further comprises data transmission lines coupled to the first and second computers, and wherein the packages is transmitted over the data transmission lines.

15. The apparatus according to claim 14, wherein the data transmission lines comprise high speed lines.

16. The apparatus according to claim 2 wherein the first document sheet comprises a mark sense sheet having a mark sense identifier disposed thereon.

17. The apparatus according to claim 16 wherein the mark sense sheet further comprises an information region divided into a plurality of cells within which marks are provided to identify the first destination address.

18. A method for transmitting document facsimile data through a conventional text electronic mail system using conventional facsimile machines coupled to one another through a communication network, the electronic mail system being of the type wherein text messages including a first destination address for a first I/O device are input to the electronic mail system at a second I/O device and communicated to the first destination address as packages of binary encoded text characters by the electronic mail system, comprising the steps of:
   receiving the document facsimile data from a transmitting facsimile machine, the document facsimile data including:
      a first document sheet having coding thereon identifying the first document sheet as containing document facsimile data for the first destination address; and
      a second document sheet containing facsimile data to be transmitted to the first destination address;
   converting the coding in the first document sheet into a first block having bytes identifying the first destination address;
   converting the second document sheet into a second block comprising binary encoded facsimile data, the second block including a plurality of binary encoded fields forming a record which identifies the second block;
   grouping the first and second blocks together as a package.

19. The method according to claim 18 further comprising the step of temporarily storing the package in the electronic mail system.

20. The method according to claim 19 further comprising the step of transmitting the package to the first destination address.

21. The method according to claim 19 wherein the first destination address corresponds to a holding file in the electronic mail system.

22. The method according to claim 21 further comprising the step of accessing the package in the holding file.

23. The method according to claim 20 wherein the first destination address corresponds to the name of a recipient user of the electronic mail system.

24. The method according to claim 20 wherein the first destination address corresponds to a telephone number of a recipient facsimile machine.

25. The method according to claim 20 wherein the first destination address corresponds to a distribution list having a plurality of second destination addresses, and wherein the transmitting step further comprises the step of transmitting the package to the plurality of second destination addresses.

26. The method according to claim 20 wherein the document facsimile data includes a plurality of second document sheets containing facsimile data to be transmitted to the first destination address, and wherein the second document sheet converting step further comprises the step of converting the plurality of second document sheets into a plurality of second blocks comprising binary encoded facsimile data, each second block including a plurality of binary encoded fields forming a record which identifies that second block.

27. The method according to claim 26 wherein the package grouping step further comprises the steps of:
   forming a package header which identifies the first destination address; and
   forming a plurality of pointers to the plurality of second blocks associated with the destination address.

28. The method according to claim 27 wherein the transmitting step further comprises the step of transmitting the package between a first computer disposed with the first I/O device at a first location and a second computer disposed with the second I/O device at a second location.

29. The method according to claim 28 wherein the transmitting step further comprises the step of transmitting the package over high speed data transmission lines coupled to the first and second computers.

30. The method according to claim 20 wherein the first document sheet comprises a mark sense sheet having a mark sense identifier disposed thereon.

31. The method according to claim 30 wherein the mark sense sheet further comprises an information region divided into a plurality of cells within which marks are provided to identify the first destination address.

* * * * *